US010775260B2

(12) United States Patent
Grant et al.

(10) Patent No.: US 10,775,260 B2
(45) Date of Patent: Sep. 15, 2020

(54) FOCUSED MODE DETECTION FOR AN ULTRASONIC LEAK DETECTION DEVICE

(71) Applicant: Honeywell International Inc., Morris Plains, NJ (US)

(72) Inventors: Michael Grant, Poole (GB); Rodney Royston Watts, Wimborne (GB); Peter Mark Harrie, Monmouth (GB)

(73) Assignee: Honeywell International Inc., Morris Plains, NJ (US)

( * ) Notice: Subject to any disclaimer, the term of this patent is extended or adjusted under 35 U.S.C. 154(b) by 148 days.

(21) Appl. No.: 16/143,191

(22) Filed: Sep. 26, 2018

(65) Prior Publication Data
US 2020/0096412 A1 Mar. 26, 2020

(51) Int. Cl.
*G01M 3/24* (2006.01)

(52) U.S. Cl.
CPC ................... *G01M 3/24* (2013.01)

(58) Field of Classification Search
CPC ...... G01M 3/24; G01M 3/243; H05K 5/0247; H05K 5/006; H05K 5/0008; H05K 5/04; H05K 5/0052; G01L 19/0663; G01L 19/148; G01L 19/0084; G01L 19/144; G01L 19/0038; G01L 19/0645; G01L 19/147; G01L 19/143; G01D 3/08; H01L 41/29; H01L 41/1132; H01L 41/0475; H01L 41/0533; H01L 41/053;
(Continued)

(56) References Cited

U.S. PATENT DOCUMENTS 4,119,950 A * 10/1978 Redding .............. G01N 29/348
340/524
8,955,383 B2 2/2015 Huseynov et al.
(Continued)

FOREIGN PATENT DOCUMENTS

GB 2375607 A 11/2002

OTHER PUBLICATIONS

Extended European Search Report for Application. No. 19199410.2, dated Feb. 24, 2020, 7 pages.
(Continued)

*Primary Examiner* — Brandi N Hopkins
(74) *Attorney, Agent, or Firm* — Alston & Bird LLP

(57) ABSTRACT

Example computer systems, computer apparatuses, computer methods, and computer program products are disclosed for detecting a gas leak. An example computer method includes receiving an electronic indication of a monitoring mode and determining whether the monitoring mode corresponds to a standard mode or a focus mode. The example computer method further includes, in response to determining that the monitoring mode corresponds to the standard mode: monitoring a first range of ultrasonic frequencies to generate a first set of monitored data; and generating a first ultrasonic gas leak detection signal based on the first set of monitored data. The example computer method further includes, in response to determining that the monitoring mode corresponds to the focus mode: monitoring a second range of ultrasonic frequencies to generate a second set of monitored data; and generating a second ultrasonic gas leak detection signal based on the second set of monitored data.

20 Claims, 5 Drawing Sheets

(58) Field of Classification Search
CPC ....... H01L 41/23; H01L 41/31; B06B 1/0644; B06B 1/0666; G01N 29/36; G01N 29/34; G01N 29/223; G01H 11/08
See application file for complete search history.

(56) References Cited

U.S. PATENT DOCUMENTS

| | | | |
|---|---|---|---|
| 2005/0247110 A1* | 11/2005 | Sagi | G01M 3/3272 73/40 |
| 2006/0191341 A1 | 8/2006 | Olesen et al. | |
| 2015/0168249 A1* | 6/2015 | Mian | H04N 5/33 348/143 |

OTHER PUBLICATIONS

Communication Pursuant to Rules 70(2) and 70a(2) for European Patent Application No. 19199410.2, dated Apr. 6, 2020, 2 pages.

* cited by examiner

FOCUSED MODE DETECTION FOR AN ULTRASONIC LEAK DETECTION DEVICE

TECHNOLOGICAL FIELD

Example embodiments of the present disclosure relate generally to sensors and, more particularly, to ultrasonic gas leak detectors.

BACKGROUND

Industrial and commercial applications, including pressurized gas installations and processes, are increasingly utilizing gas leak sensors to detect gas leaks. However, conventional gas leak sensor designs cannot easily and cost-effectively detect gas leaks in the presence of environmental noise.

Applicant has identified a number of deficiencies and problems associated with conventional gas leak sensors. Through applied effort, ingenuity, and innovation, many of these identified problems have been solved by developing solutions that are included in embodiments of the present disclosure, many examples of which are described in detail herein.

SUMMARY

Systems, apparatuses, methods, and computer program products are disclosed herein for providing an ultrasonic gas leak detector with a monitoring mode that is selectable between a standard mode and a focus mode.

In one example embodiment, a computer system is provided for detecting a gas leak. The computer system may comprise communications circuitry configured to receive, by from a user device, an electronic indication of a monitoring mode for an ultrasonic gas leak detection device. The computer system may further comprise monitoring mode determination circuitry in communication with the communications circuitry. The monitoring mode determination circuitry may be configured to determine whether the monitoring mode corresponds to a standard mode or a focus mode. The computer system may further comprise ultrasonic gas leak monitoring circuitry in communication with the monitoring mode determination circuitry. The ultrasonic gas leak monitoring circuitry may be configured to, in response to a first determination that the monitoring mode corresponds to the standard mode, monitor a first range of ultrasonic frequencies to generate a first set of monitored data. The ultrasonic gas leak monitoring circuitry may be further configured to, in response to a second determination that the monitoring mode corresponds to the focus mode, monitor a second range of ultrasonic frequencies to generate a second set of monitored data. The computer system may further comprise ultrasonic gas leak detection circuitry in communication with the ultrasonic gas leak monitoring circuitry. The ultrasonic gas leak monitoring circuitry may be configured to, in response to the first determination that the monitoring mode corresponds to the standard mode, generate a first ultrasonic gas leak detection signal based on the first set of monitored data. The ultrasonic gas leak monitoring circuitry may be further configured to, in response to the second determination that the monitoring mode corresponds to the focus mode, generate a second ultrasonic gas leak detection signal based on the second set of monitored data.

In another example embodiment, a computer method is provided for detecting a gas leak. The method may comprise receiving, by communications circuitry from a user device, an electronic indication of a monitoring mode for an ultrasonic gas leak detection device. The method may further comprise determining, by monitoring mode determination circuitry, whether the monitoring mode corresponds to a standard mode or a focus mode. The method may further comprise, in response to determining that the monitoring mode corresponds to the standard mode: monitoring, by ultrasonic gas leak monitoring circuitry, a first range of ultrasonic frequencies to generate a first set of monitored data; and generating, by ultrasonic gas leak detection circuitry, a first ultrasonic gas leak detection signal based on the first set of monitored data. The method may further comprise, in response to determining that the monitoring mode corresponds to the focus mode: monitoring, by the ultrasonic gas leak monitoring circuitry, a second range of ultrasonic frequencies to generate a second set of monitored data; and generating, by the ultrasonic gas leak detection circuitry, a second ultrasonic gas leak detection signal based on the second set of monitored data.

In yet another example embodiment, a computer program product is provided for detecting a gas leak. The computer program product may comprise at least one non-transitory computer-readable storage medium storing computer-executable program code instructions that, when executed by a computing system, cause the computing system to receive, by communications circuitry from a user device, an electronic indication of a monitoring mode for an ultrasonic gas leak detection device. The computer-executable program code instructions, when executed by the computing system, may further cause the computing system to determine, by monitoring mode determination circuitry, whether the monitoring mode corresponds to a standard mode or a focus mode. The computer-executable program code instructions, when executed by the computing system, may further cause the computing system to, in response to a first determination that the monitoring mode corresponds to the standard mode: monitor, by ultrasonic gas leak monitoring circuitry, a first range of ultrasonic frequencies to generate a first set of monitored data; and generate, by ultrasonic gas leak detection circuitry, a first ultrasonic gas leak detection signal based on the first set of monitored data. The computer-executable program code instructions, when executed by the computing system, may further cause the computing system to, in response to a second determination that the monitoring mode corresponds to the focus mode: monitor, by the ultrasonic gas leak monitoring circuitry, a second range of ultrasonic frequencies to generate a second set of monitored data; and generate, by the ultrasonic gas leak detection circuitry, a second ultrasonic gas leak detection signal based on the second set of monitored data.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which illustrate example embodiments and features of the present disclosure and are not necessarily drawn to scale. It will be understood that the components and structures illustrated in the drawings may or may not be present in various embodiments of the disclosure described herein. Accordingly, some embodiments or features of the present disclosure may include fewer or more components or structures than those shown in the drawings while not departing from the scope of the disclosure.

DETAILED DESCRIPTION

Figure 1:
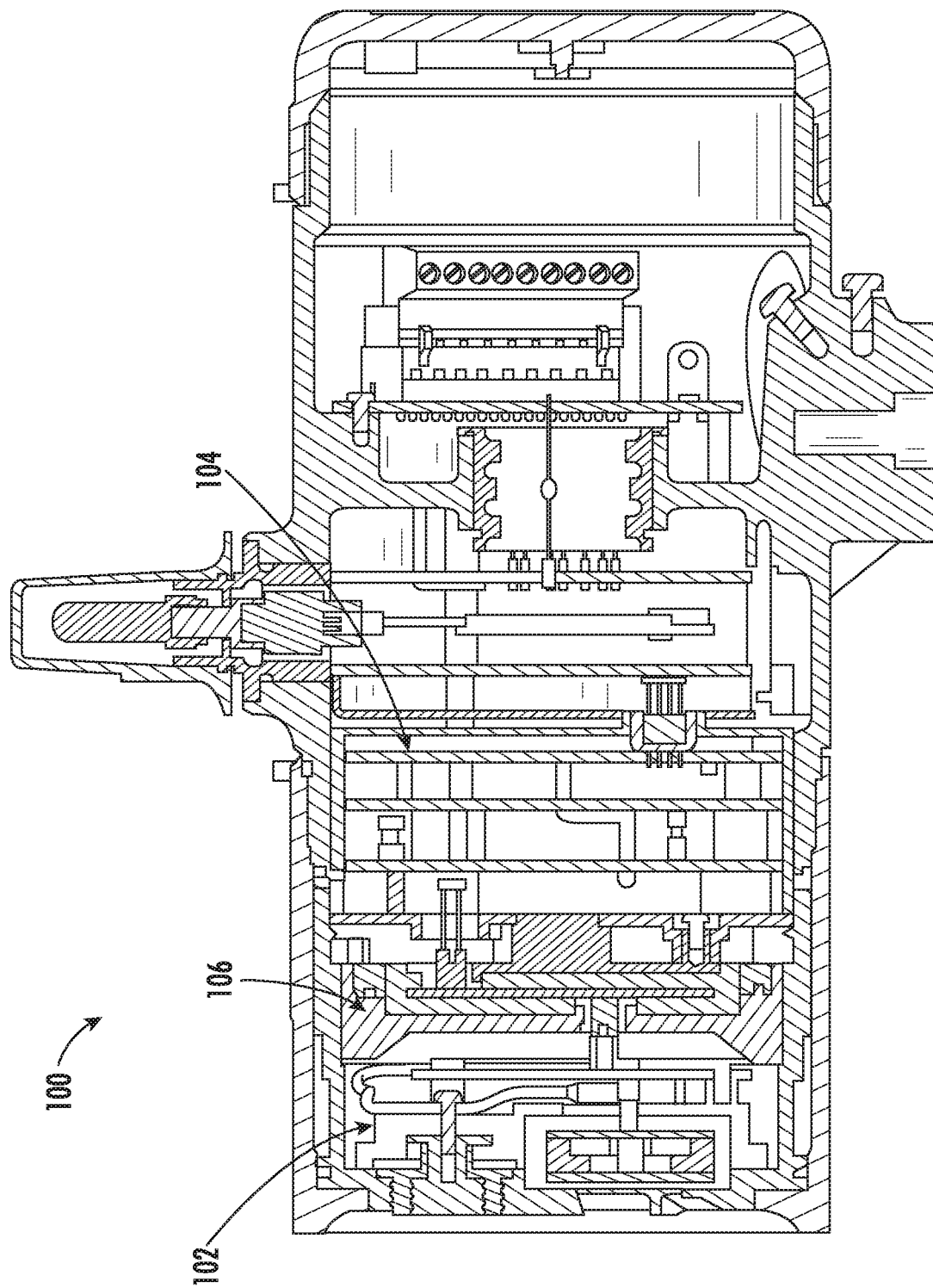
FIG. 1 illustrates an example cross-sectional view of an example ultrasonic gas leak detector in accordance with some example embodiments described herein.

The following description should be read with reference to the drawings wherein like reference numerals indicate like elements throughout the several views. The detailed description and drawings show several embodiments which are meant to be illustrative of the disclosure. It should be understood that any numbering of disclosed features (e.g., first, second, etc.) and/or directional terms used in conjunction with disclosed features (e.g., front, back, under, above, etc.) are relative terms indicating illustrative relationships between the pertinent features.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The word "example," when used herein, is intended to mean "serving as an example, instance, or illustration." Any implementation described herein as an "example" is not necessarily preferred or advantageous over other implementations.

The ability to detect a gas leak from pressurized gas installations or processes in which there is pressurized gas is an important safety feature. This is especially so in industrial applications such as the oil and gas vertical, upstream and downstream. A gas leak from such installations produces a broadband acoustic signal in the range of audible and ultrasonic frequencies, which is one of the detection methods for such leaks. The detection of gas leaks based on acoustic detection has a number of advantages in comparison with the alternative types of gas detection which rely on the physical contact (e.g., proximity) with the gas molecules of the leak. This is especially true in windy conditions, when the gas leak plume may be directed away from the other types of gas detection. The main challenges for the acoustic detection of gas leaks are the alternative sources of an acoustic signal, which may lead to false alarms and the range of detection.

A typical industrial gas installation may have some operating machines which will produce an audible signal. However, the background signal level for the ultrasonic frequency range above 20 kilohertz (kHz) is usually quite low due to the strong attenuation of these frequencies in the atmosphere (0.5-3.0 decibels per meter (dB/m)). That is the main reason that typical gas leak detection devices operate in the ultrasonic frequency range even though the detection range in the atmosphere is below 50 meters. Various natural or artificial sources of ultrasound signal may interfere with such gas leak detectors. Examples of these are rattling chains, rotating faulty bearings, vibrating metal surfaces etc. The disclosure solves the problems described above by providing a unique design for an ultrasonic gas leak detector as described in further detail below.

Example embodiments described herein provide systems, apparatuses, and methods for an ultrasonic gas leak detector which provides a focus mode detection technique in addition to a standard mode detection technique. In some instances, the focus mode detection technique disclosed herein allows the ultrasound gas leak detector to monitor for gas leaks in a specific direction and a specific distance and thus reduces or eliminates false alarms from alternative interfering sources of ultrasound.

The embodiments disclosed herein provide for focus mode detection for an ultrasonic gas leak detection device based on the physical properties of the ultrasonic device and an ultrasonic microphone incorporated therein. Although the ultrasonic gas leak detection device is also configured to utilize a standard mode (e.g., standard wide detection), the focus mode allows the device to provide: directionality (e.g., the device monitors only ultrasound in a narrow viewing angle); and a narrow range (e.g., the device monitors only ultrasound in specified distance from the instrument). In this way, any other source of ultrasound may be eliminated due to the strong signal rejection applicable for the signal located outside the focus of the measurements. In some embodiments, the two modes (e.g., standard mode and focus mode) may be implemented in firmware with respect to frequency analysis. In some embodiments, these techniques may be augmented by a learning technique based on machine prediction data generated based on the monitored data and the gas leak detection signals.

There are many advantages of the embodiments disclosed herein, such as: improved detection of a gas leak in the presence of noise; coverage of a tight (e.g., focused) area in the presence of other ultrasound noise sources and thereby preventing or reducing false alarms; increased application into traditionally difficult monitoring environments. In use, the addition of the focus mode to the ultrasonic gas leak detector provides for optimization of detection in the presence of noise sources and an additional troubleshooting process over and above threshold setting.

Although the disclosure describes the features of the standard and focus mode detection techniques with reference to an ultrasonic gas leak detector, the detection techniques disclosed herein may be applied in any suitable sensor, detector, gauge, instrument, or application where acoustic detection is utilized, utilizable, or otherwise desirable.

FIG. 1 illustrates an example cross-sectional view of an example ultrasonic gas leak detector 100 in accordance with some example embodiments described herein. The example ultrasonic gas leak detector 100 comprises a sensor sub-module 102, a processor sub-module 104, and a barrier 106. The barrier 106 may be configured to provide an electrical connection between the sensor sub-module 102 and the processor sub-module 104. The barrier 106 is further configured to secure flame spread restriction requirements by preventing or restricting flame spread between the sensor sub-module 102 and the processor sub-module 104. In some embodiments, a maximum length of the barrier 106 is less than about 30 millimeters. In some embodiments, a maximum diameter of the barrier 106 is less than about 90 millimeters. In some embodiments, the sensor sub-module 102 may comprise a directionally-sensitive microphone having a 20 millimeter diaphragm.

In some embodiments, the example ultrasonic gas leak detector 100 may be in communication with, or a part of, a user device. The user device may be embodied by one or more computing devices. Information received by the ultrasonic gas leak detector 100 from the user devices may be provided in various forms and via various methods. For example, the user device may be a handheld device (e.g., a handheld ultrasonic gas leak detector), laptop computer, smartphone, netbook, tablet computer, wearable device, desktop computer, electronic workstation, or the like, and the information may be provided through various modes of data transmission provided by these user devices. In some embodiments, a user may use the user device to select a monitoring mode for the ultrasonic gas leak detector 100. In some embodiments, the monitoring mode may be either a standard mode or a focus mode.

Figure 2:
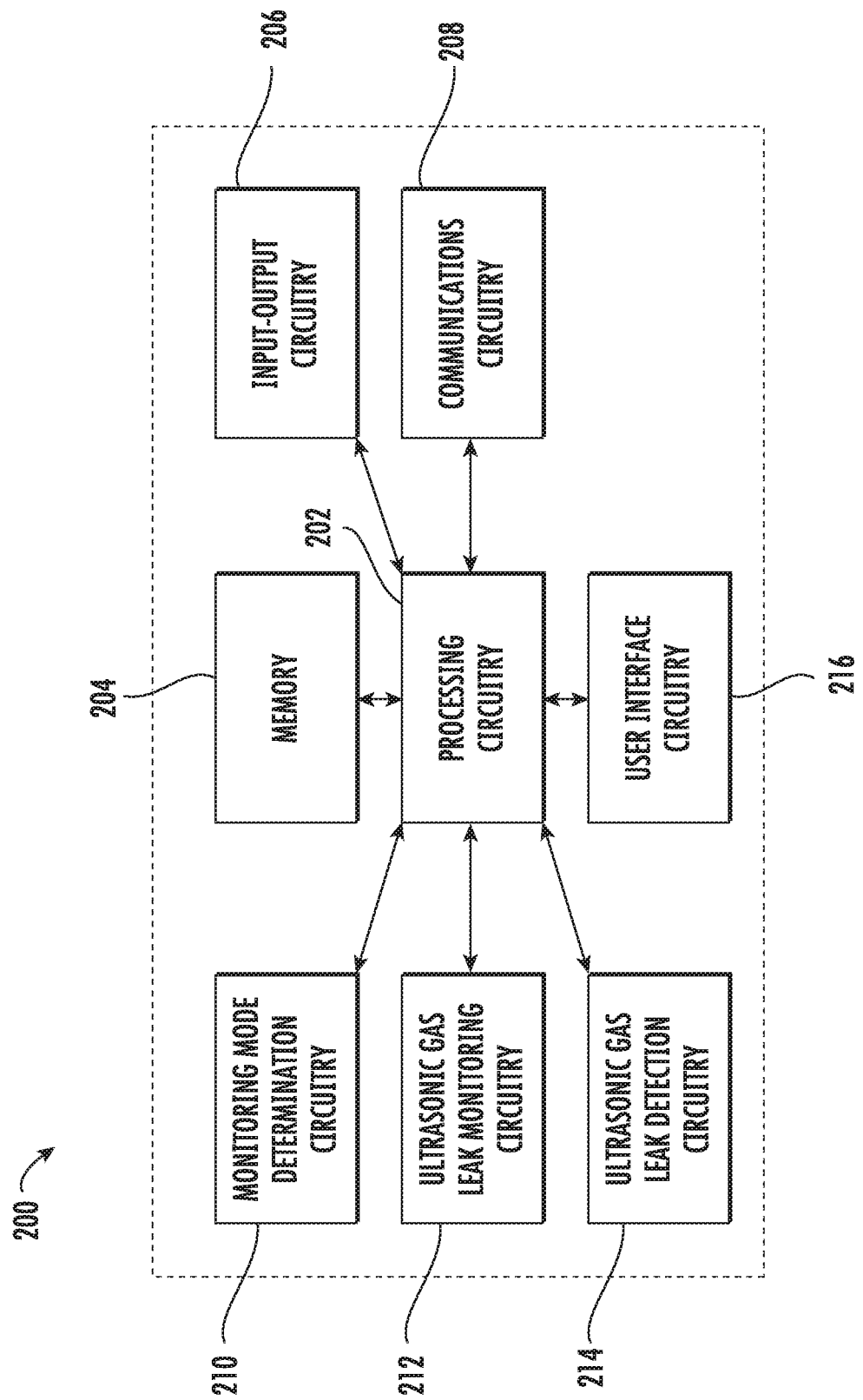
FIG. 2 illustrates an example schematic block diagram in accordance with some example embodiments described herein.

The ultrasonic gas leak detector 100 described with reference to FIG. 1 may be embodied by one or more computing apparatuses, such as apparatus 200 shown in FIG. 2. As illustrated in FIG. 2, the apparatus 200 may include processing circuitry 202, memory 204, input-output circuitry 206, communications circuitry 208, monitoring mode determination circuitry 210, ultrasonic gas leak monitoring circuitry 212, ultrasonic gas leak detection circuitry 214, and user interface circuitry 216. The apparatus 200 may be configured to execute the operations described above with respect to FIG. 1 and below with respect to FIGS. 3-5. Although some of these components 202-216 are described with respect to their functional capabilities, it should be understood that the particular implementations necessarily include the use of particular hardware to implement such functional capabilities. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory 204 may be an electronic storage device (e.g., a computer readable storage medium). In another example, the memory 204 may be a non-transitory computer-readable storage medium storing computer-executable program code instructions that, when executed by a computing system, cause the computing system to perform the various operations described herein. The memory 204 may be configured to store information, data, content, signals applications, instructions (e.g., computer-executable program code instructions), or the like, for enabling the apparatus 200 to carry out various functions in accordance with example embodiments of the present disclosure. For example, the memory 204 may be configured to store electronic indications of monitoring modes; standard mode detection techniques; focus mode detection techniques; monitored data; ranges of monitored data; ranges of frequencies (e.g., band-gap filters); ultrasonic gas leak detection signals; any other suitable data or data structures; or any combination or combinations thereof. It will be understood that the memory 204 may be configured to store partially or wholly any electronic information, data, data structures, embodiments, examples, figures, processes, operations, techniques, algorithms, instructions, systems, apparatuses, methods, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processing circuitry 202. Alternatively or additionally, the processing circuitry 202 may be configured to execute hard-coded functionality. As such, whether configured by hardware or software methods, or by a combination of hardware with software, the processing circuitry 202 may represent an entity (e.g., physically embodied in circuitry) capable of performing operations according to an embodiment of the present disclosure while configured accordingly. As another example, when the processing circuitry 202 is embodied as an executor of program code instructions, the instructions may specifically configure the processor to perform the operations described herein when the instructions are executed.

In some embodiments, the apparatus 200 may include input-output circuitry 206 that may, in turn, be in communication with processing circuitry 202 to provide output to the user and, in some embodiments, to receive input such as a command provided by the user. The input-output circuitry 206 may comprise a user interface, such as a graphical user interface (GUI), and may include a display that may include a web user interface, a GUI application, a mobile application, a client device, or any other suitable hardware or software. In some embodiments, the input-output circuitry 206 may also include a keyboard, a mouse, a joystick, a display device, a display screen, a touch screen, touch areas, soft keys, a microphone, a speaker, or other input-output mechanisms. The processing circuitry 202, input-output circuitry 206 (which may utilize the processing circuitry 202), or both may be configured to control one or more functions of one or more user interface elements through computer-executable program code instructions (e.g., software, firmware) stored in a non-transitory computer-readable storage medium (e.g., memory 204). Input-output circuitry 206 is optional and, in some embodiments, the apparatus 200 may not include input-output circuitry. For example, where the apparatus 200 does not interact directly with the user, the apparatus 200 may generate user interface data for display by one or more other devices with which one or more users directly interact and transmit the generated user interface data to one or more of those devices. For example, the apparatus 200, using user interface circuitry 216, may generate user interface data for display by one or more display devices and transmit the generated user interface data to those display devices.

The communications circuitry 208 may be any device or circuitry embodied in either hardware or a combination of hardware and software that is configured to receive or transmit data from or to a network or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted or received by the apparatus 200 using any of a number of Internet, Ethernet, cellular, satellite, or wireless technologies, such as IEEE 802.11, Code Division Multiple Access (CDMA), Global System for Mobiles (GSM), Universal Mobile Telecommunications System (UMTS), Long-Term Evolution (LTE), Bluetooth® v1.0 through v5.0, Bluetooth Low Energy (BLE), infrared wireless (e.g., IrDA), ultra-wideband (UWB), induction wireless transmission, Wi-Fi, near field communications (NFC), Worldwide Interoperability for Microwave Access (WiMAX), radio frequency (RF), RFID, or any other suitable technologies.

In some embodiments, communications circuitry 208 may comprise hardware components designed or configured to receive, from a user device, an electronic indication of a monitoring mode for an ultrasonic gas leak detection device. In some embodiments, the communications circuitry 208 may receive the electronic indication of the monitoring mode in response to a user using input-output circuitry 206 of a user device to select a monitoring mode from a list of monitoring modes (e.g., a list of monitoring modes comprising a standard mode and a focus mode) displayed in a graphical user interface provided by user interface circuitry 216. In some embodiments, the electronic indication of the monitoring mode may correspond to a standard mode or a focus mode.

The monitoring mode determination circuitry 210 includes hardware components designed or configured to receive, process, generate, and transmit data, such as the electronic indication of a monitoring mode. In some embodiments, the monitoring mode determination circuitry 210 may be in communication with the communications circuitry 208 and thus configured to receive the electronic indication of the monitoring mode from the communications circuitry 208. The monitoring mode determination circuitry 210 may be configured to determine whether the monitoring mode corresponds to a standard mode or a focus mode. For example, the monitoring mode determination circuitry 210 may determine that the monitoring mode corresponds to the standard mode when the electronic indication of the monitoring mode corresponds to the standard mode. In another example, the monitoring mode determination circuitry 210 may determine that the monitoring mode corresponds to the standard mode when the electronic indication of the monitoring mode is indicative of a null or empty value or, in some instances, when no electronic indication of a monitoring mode is received at all. In another example, the monitoring mode determination circuitry 210 may determine that the monitoring mode corresponds to the focus mode when the electronic indication of the monitoring mode corresponds to the focus mode.

The ultrasonic gas leak monitoring circuitry 212 includes hardware components designed or configured to receive, process, generate, and transmit data, such as monitored data. In some embodiments, in response to a first determination, by the monitoring mode determination circuitry 210, that the selected mode corresponds to the standard mode, the ultrasonic gas leak monitoring circuitry 212 may be configured to monitor a first range of ultrasonic frequencies to generate a first set of monitored data. In some embodiments, the first range of ultrasonic frequencies may be a lower range of ultrasonic frequencies, such as the range of ultrasonic frequencies from about 20 kHz to about 30 kHz. In some embodiments, the ultrasonic gas leak monitoring circuitry 212 may monitor the first range of ultrasonic frequencies using a microphone having a 20 millimeter diaphragm. In some embodiments, the first set of monitored data may correspond to the monitored data 402 shown in FIG. 4.

In some embodiments, in response to a second determination, by the monitoring mode determination circuitry 210, that the selected mode corresponds to the focus mode, the ultrasonic gas leak monitoring circuitry 212 may be configured to monitor a second range of ultrasonic frequencies to generate a second set of monitored data. In some embodiments, the second range of ultrasonic frequencies may be a higher range of ultrasonic frequencies, such as the range of ultrasonic frequencies from about 50 kHz to about 70 kHz. In some embodiments, the ultrasonic gas leak monitoring circuitry 212 may monitor the second range of ultrasonic frequencies using a microphone having a 20 millimeter diaphragm. In some embodiments, the second set of monitored data may correspond to the monitored data 404 shown in FIG. 4.

The ultrasonic gas leak detection circuitry 214 includes hardware components designed or configured to receive, process, generate, and transmit data, such as ultrasonic gas leak detection signals. In some embodiments, in response to the first determination, by the monitoring mode determination circuitry 210, that the selected mode corresponds to the standard mode, the ultrasonic gas leak detection circuitry 214 may be configured to generate a first ultrasonic gas leak detection signal based on the first set of monitored data. In some embodiments, the first ultrasonic gas leak detection signal may be indicative of a gas leak. In some embodiments, the first ultrasonic gas leak detection signal may be, for example, an audible alarm, a visual alarm, an electronic message, an electronic notification, a warning light, a status light (e.g., green, yellow, red, and blinking variants thereof), a control signal (e.g., an alarm system activation or deactivation signal, a sprinkler system activation or deactivation signal), any other suitable signal, or a combination thereof.

In some embodiments, in response to the second determination, by the monitoring mode determination circuitry 210, that the selected mode corresponds to the focus mode, the ultrasonic gas leak detection circuitry 214 may be configured to generate a second ultrasonic gas leak detection signal based on the second set of monitored data. In some embodiments, the second ultrasonic gas leak detection signal may be indicative of a gas leak. In some embodiments, the second ultrasonic gas leak detection signal may be, for example, an audible alarm, a visual alarm, an electronic message, an electronic notification, a warning light, a status light (e.g., green, yellow, red, and blinking variants thereof), a control signal (e.g., an alarm system activation or deactivation signal, a sprinkler system activation or deactivation signal), any other suitable signal, or a combination thereof.

The user interface circuitry 216 includes hardware components designed or configured to receive, process, generate, and transmit data, such as user interface data. In some embodiments, the user interface circuitry 216 may be configured to generate user interface data indicative of a set of monitoring modes comprising a standard mode and a focus mode. In some instances, the user interface data may comprise a list (e.g., a selectable drop-down list, a ordered grouping of selectable icons (e.g., clickable icons configured to be clicked by a mouse; virtual icons configured to be displayed on a touchscreen and pressed by a user's finger), a text-based prompt, a voice-based prompt) of monitoring modes comprising a standard mode and a focus mode. For instance, the user interface circuitry 216 includes hardware components designed or configured to generate the user interface data based on any embodiment or combination of embodiments described with reference to FIGS. 1-5.

In some embodiments, the user interface circuitry 216 may be in communication with a display device (e.g., input-output circuitry 206, a user device, or a display device communicatively coupled thereto) and thus configured to transmit the user interface data to the display device. For example, the user interface circuitry 216 may be configured to generate user interface data and transmit the generated user interface data to the input-output circuitry 206, and the input-output circuitry 206 may be configured to receive the user interface data and display the received user interface data on one or more display screens.

In some embodiments, the user interface circuitry 216 may be configured to transmit the user interface data to the communications circuitry 208. The communications circuitry 208 may be configured to transmit the user interface data to the user device. The communications circuitry 208 may be further configured receive the electronic indication of the monitoring mode in response to a user selection of one of the standard mode and the focus mode.

In some embodiments, each of the monitoring mode determination circuitry 210, ultrasonic gas leak monitoring circuitry 212, ultrasonic gas leak detection circuitry 214, and user interface circuitry 216 may include a separate processor, specially configured field programmable gate array (FPGA), application specific interface circuit (ASIC), or cloud utility to perform the above functions. In some embodiments, the hardware components described above with reference to monitoring mode determination circuitry 210, ultrasonic gas leak monitoring circuitry 212, ultrasonic gas leak detection circuitry 214, and user interface circuitry 216, may, for instance, utilize communications circuitry 208 or any suitable wired or wireless communications path to communicate with a user device, each other, or any other suitable circuitry or device.

In some embodiments, one or more of the monitoring mode determination circuitry 210, ultrasonic gas leak monitoring circuitry 212, ultrasonic gas leak detection circuitry 214, and user interface circuitry 216 may be hosted locally by the apparatus 200. In some embodiments, one or more of the monitoring mode determination circuitry 210, ultrasonic gas leak monitoring circuitry 212, ultrasonic gas leak detection circuitry 214, and user interface circuitry 216 may be hosted remotely (e.g., by one or more cloud servers) and thus need not physically reside on the apparatus 200. Thus, some or all of the functionality described herein may be provided by a remote circuitry. For example, the apparatus 200 may access one or more remote circuitries via any sort of networked connection that facilitates transmission of data and electronic information between the apparatus 200 and the remote circuitries. In turn, the apparatus 200 may be in remote communication with one or more of the monitoring mode determination circuitry 210, ultrasonic gas leak monitoring circuitry 212, ultrasonic gas leak detection circuitry 214, and user interface circuitry 216.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

The user device may be embodied by one or more computing devices or systems that also may include processing circuitry, memory, input-output circuitry, and communications circuitry. For example, a user device may be a laptop computer on which an app (e.g., a GUI application) is running or otherwise being executed by processing circuitry. In yet another example, a user device may be a smartphone on which an app (e.g., a webpage browsing app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data with the ultrasonic gas leak detector described herein.

Having described specific components of example devices involved in the present disclosure, example procedures for detecting gas leaks are described below in connection with FIGS. 3-5.

Figure 3:
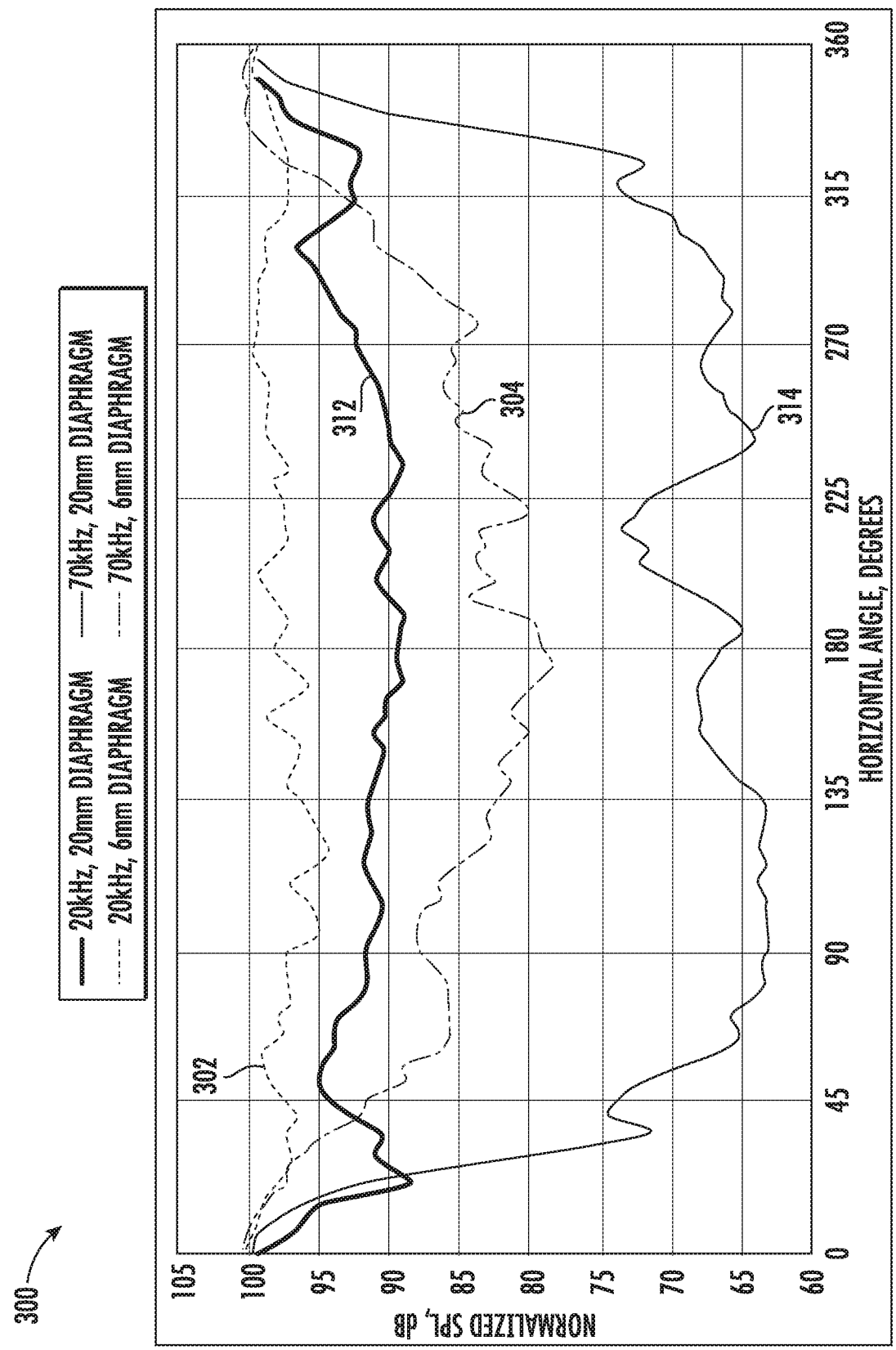
FIG. 3 illustrates example ultrasonic measurements in accordance with some example embodiments described herein.

FIG. 3 illustrates example ultrasonic measurements 300 in accordance with some example embodiments described herein. As shown in FIG. 3, monitored data 302 (e.g., 20 kHz) and monitored data 304 (e.g., 70 kHz) represent monitored data generated using a directionally-sensitive microphone having a 6 millimeter diaphragm, whereas monitored data 312 (e.g., 20 kHz) and monitored data 314 (e.g., 70 kHz) represent monitored data generated using a directionally-sensitive microphone having a 20 millimeter diaphragm.

As illustrated by FIG. 3, at lower ultrasonic frequencies (e.g., 20 kHz), microphones with a large diaphragm (e.g., 20 mm) and microphones with a small diaphragm (e.g., 6 mm) have substantially similar pick patterns, which may be either omnidirectional or cardioid. In contrast, at higher ultrasonic frequencies (e.g., 70 kHz), microphones with a large diaphragm (e.g., 20 mm) and microphones with a small diaphragm (e.g., 6 mm) have substantially different pick patterns. For instance, the higher the frequency and the larger the diaphragm of a microphone, the more directional that microphone may be.

In some embodiments, the ultrasonic gas leak detector may require a microphone with a large diaphragm (e.g., 20 mm) to operate in focus mode such that the ultrasonic gas leak detector has very good directionality at high frequencies. At the same time, due to strong atmospheric attenuation, the high frequencies have very limited detection range such that the range of an ultrasonic gas leak detector operating in focus mode is decreased. Accordingly, if the analysis (by circuitry without user interaction) of the microphone signal is limited to the higher ultrasonic frequencies (e.g., 60-70 kHz), and the diaphragm of the microphone is sufficiently large (e.g., 20 mm), the monitoring mode may be a focus mode.

Figure 4:
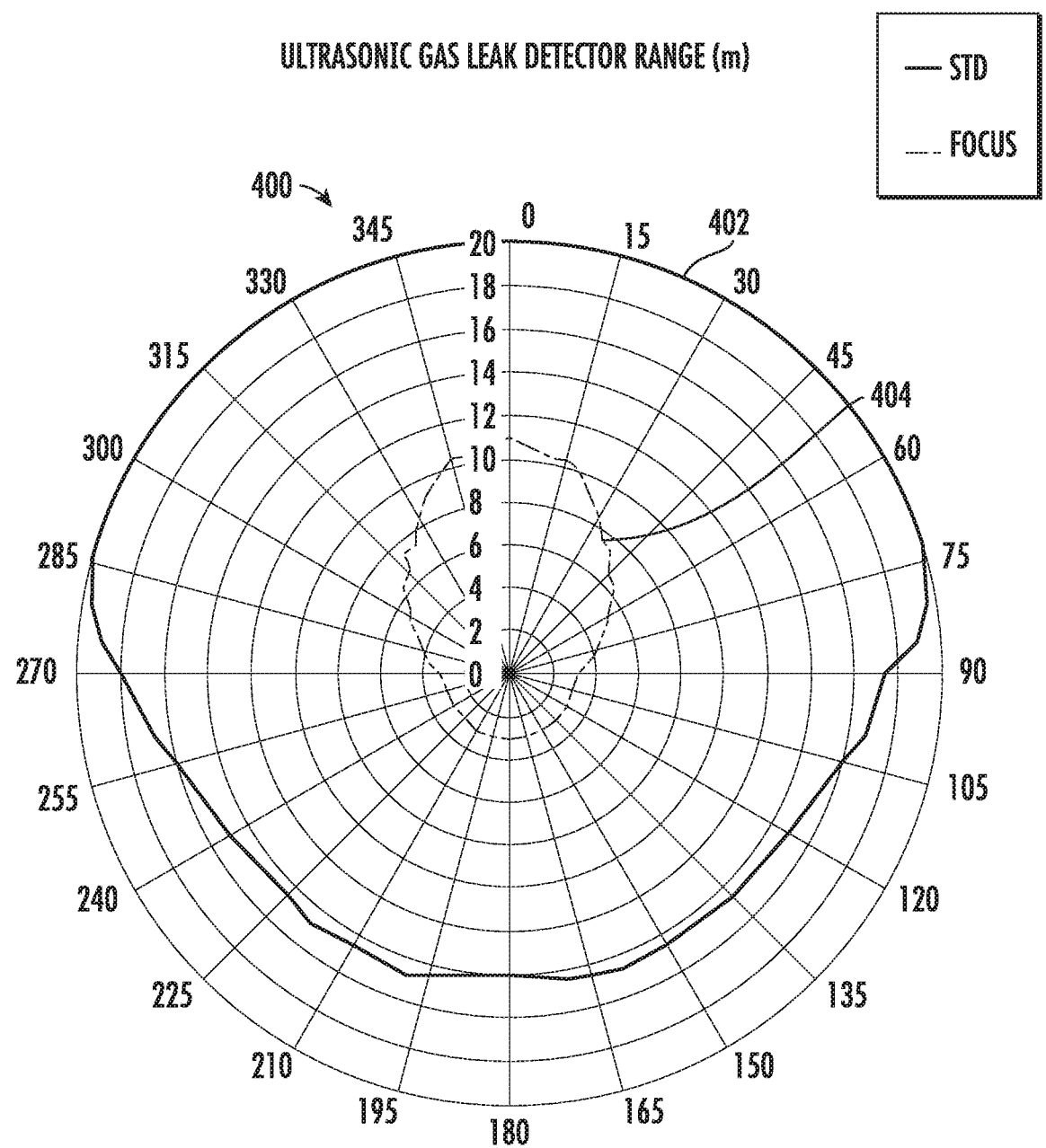
FIG. 4 illustrates example ultrasonic measurements in accordance with some example embodiments described herein.

FIG. 4 illustrates example ultrasonic measurements 400 in accordance with some example embodiments described herein. As shown in FIG. 4, monitored data 402 corresponds to monitored data generated using a standard mode detection technique by monitoring a first range of ultrasonic frequencies (e.g., from about 20 kHz to about 30 kHz). Monitored data 404 corresponds to monitored data generated using a focus mode detection technique by monitoring a second range of ultrasonic frequencies (e.g., from about 50 kHz to about 70 kHz). In some instances, monitored data 402 and monitored data 404 represent monitored data generated using a directionally-sensitive microphone having a 20 millimeter diaphragm.

Having described specific components of example devices involved in the present disclosure, example procedures for providing an ultrasonic gas leak detector configured to detect a gas leak based on either a standard mode detection technique or a focus mode detection technique are described below in connection with FIG. 5.

Figure 5:
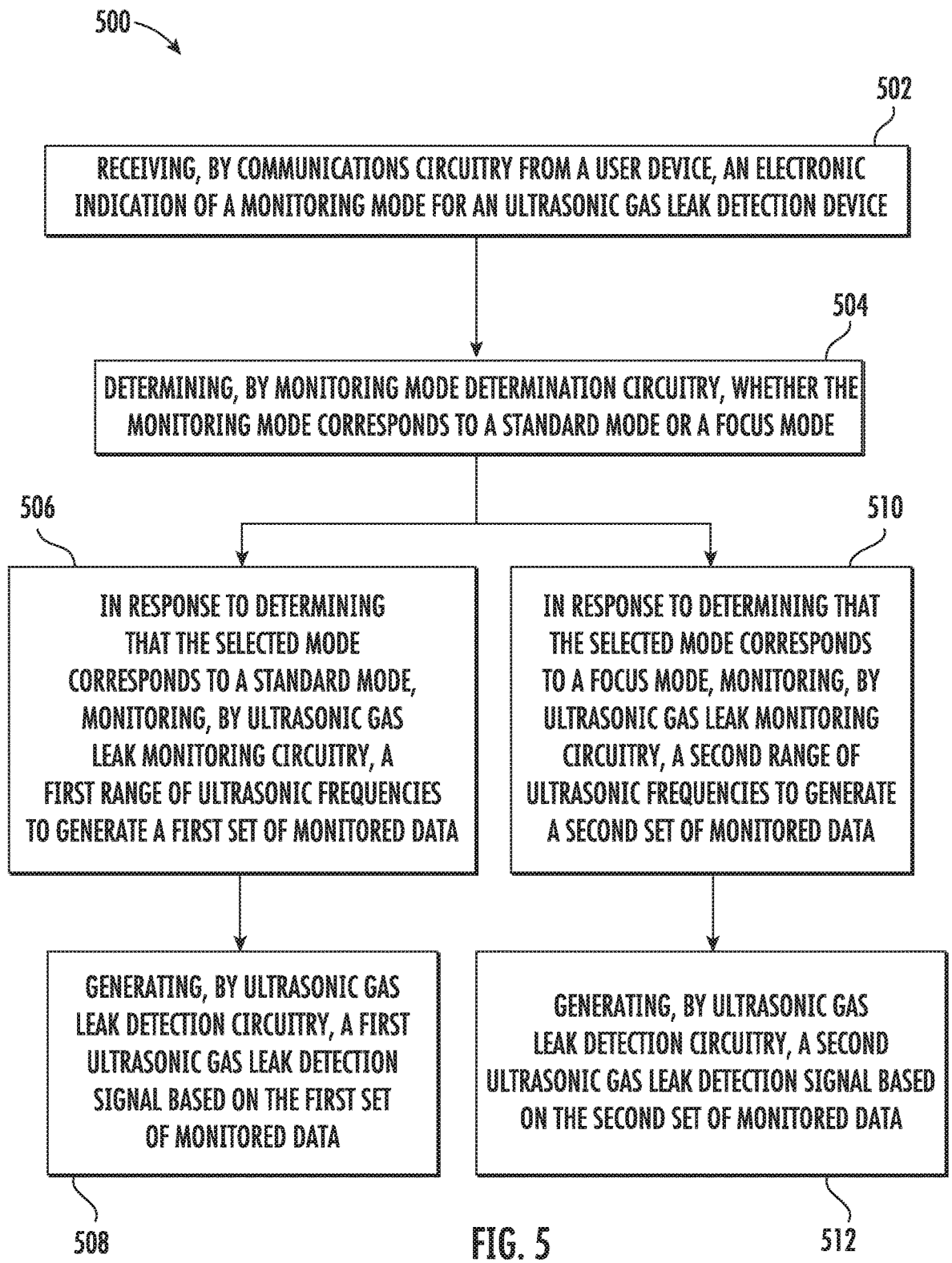
FIG. 5 illustrates an example flowchart illustrating an example method in accordance with some example embodiments described herein.

FIG. 5 illustrates an example flowchart 500 that contains example operations for detecting a gas leak according to some example embodiments described herein. The operations described in connection with FIG. 5 may, for example, be performed by one or more components described with reference to ultrasonic gas leak detector 100 shown in FIG. 1 (e.g., by or through the use of sensor sub-module 102, processor sub-module 104, or a combination thereof); by apparatus 200 shown in FIG. 2 (e.g., by or through the use of one or more of processing circuitry 202, memory 204, input-output circuitry 206, communications circuitry 208, monitoring mode determination circuitry 210, ultrasonic gas leak monitoring circuitry 212, ultrasonic gas leak detection circuitry 214, user interface circuitry 216, any other suitable circuitry, and any combination thereof); by any other component described herein; or by any combination thereof.

As shown by block 502, the apparatus 200 includes means, such as communications circuitry 208 or the like, for receiving, from a user device, an electronic indication of a monitoring mode for an ultrasonic gas leak detection device. In some embodiments, the electronic indication of the monitoring mode may be received by the communications circuitry 208 in response to a user using the input-output circuitry 206 of a user device to select a monitoring mode from a list of monitoring modes comprising a standard mode and a focus mode displayed in a graphical user interface provided by user interface circuitry 216. In some embodiments, the electronic indication of the monitoring mode may correspond to a standard mode or a focus mode.

As shown by block 504, the apparatus 200 includes means, such as monitoring mode determination circuitry 210 or the like, for determining whether the monitoring mode corresponds to a standard mode or a focus mode. In response to determining that the selected mode corresponds to a standard mode, the flowchart 500 may proceed to operation 506. In response to determining that the selected mode corresponds to a focus mode, the flowchart 500 may proceed to operation 510.

As shown by block 506, the apparatus 200 includes means, such as ultrasonic gas leak monitoring circuitry 212 or the like, for monitoring a first range of ultrasonic frequencies to generate a first set of monitored data. In some embodiments, the first range of ultrasonic frequencies may be a lower range of ultrasonic frequencies, such as the range of ultrasonic frequencies from about 20 kHz to about 30 kHz. In some embodiments, the ultrasonic gas leak monitoring circuitry 212 may monitor the first range of ultrasonic frequencies using a microphone having a 20 millimeter diaphragm.

As shown by block 508, the apparatus 200 includes means, such as ultrasonic gas leak detection circuitry 214 or the like, for generating a first ultrasonic gas leak detection signal based on the first set of monitored data. The first ultrasonic gas leak detection signal may be, for example, an audible alarm, a visual alarm, an electronic message, an electronic notification, a warning light, a status light (e.g., green, yellow, red, and blinking variants thereof), a control signal (e.g., an alarm system activation or deactivation signal, a sprinkler system activation or deactivation signal), any other suitable signal, or a combination thereof.

As shown by block 510, the apparatus 200 includes means, such as ultrasonic gas leak monitoring circuitry 212 or the like, for monitoring a second range of ultrasonic frequencies to generate a second set of monitored data. In some embodiments, the second range of ultrasonic frequencies may be a higher range of ultrasonic frequencies, such as the range of ultrasonic frequencies from about 50 kHz to about 70 kHz. In some embodiments, the ultrasonic gas leak monitoring circuitry 212 may monitor the second range of ultrasonic frequencies using a microphone having a 20 millimeter diaphragm.

As shown by block 512, the apparatus 200 includes means, such as ultrasonic gas leak detection circuitry 214 or the like, for generating a second ultrasonic gas leak detection signal based on the second set of monitored data. The second ultrasonic gas leak detection signal may be, for example, an audible alarm, a visual alarm, an electronic message, an electronic notification, a warning light, a status light (e.g., green, yellow, red, and blinking variants thereof), a control signal (e.g., an alarm system activation or deactivation signal, a sprinkler system activation or deactivation signal), any other suitable signal, or a combination thereof.

In some embodiments, operations 502, 504, 506, 508, 510, and 512 may not necessarily occur in the order depicted in FIG. 5. In some embodiments, one or more of the operations depicted in FIG. 5 may occur substantially simultaneously. In some embodiments, one or more additional operations may be involved before, after, or between any of the operations shown in FIG. 5.

As described above and with reference to FIGS. 1-5, example embodiments of the present disclosure thus provide for an ultrasonic gas leak detector which provides a focus mode detection technique in addition to a standard mode detection technique. Thus, the ultrasonic gas leak detector disclosed herein may easily and cost-effectively detect gas leaks in the presence of wind, noise, or both.

FIG. 5 thus illustrates an example flowchart describing operations performed in accordance with example embodiments of the present disclosure. It will be understood that each block of the flowchart, and combinations of blocks in the flowchart, may be implemented by various means, such as devices comprising hardware, firmware, one or more processors, and/or circuitry associated with execution of software comprising one or more computer program instructions. For example, one or more of the procedures described above may be performed by execution of program code instructions. In this regard, the program code instructions that, when executed, cause performance of the procedures described above may be stored by a non-transitory computer-readable storage medium (e.g., memory 204) of a computing apparatus (e.g., apparatus 200) and executed by a processor (e.g., processing circuitry 202) of the computing apparatus. In this regard, the computer program instructions which embody the procedures described above may be stored by a memory of an apparatus employing an embodiment of the present disclosure and executed by a processor of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart 500. When executed, the instructions stored in the computer-readable storage memory produce an article of manufacture configured to implement the various functions specified in the flowchart 500. The program code instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the operations of flowchart 500. Moreover, execution of a computer or other processing circuitry to perform various functions converts the computer or other processing circuitry into a particular machine configured to perform an example embodiment of the present disclosure.

The flowchart operations described with reference to FIG. 5 support combinations of means for performing the specified functions and combinations of operations for performing the specified functions. It will be understood that one or more operations of the flowchart, and combinations of operations in the flowchart, may be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," and similar words are not intended to limit the order of the steps; these words are simply used to guide the reader through the description of the methods. Further, any reference to claim elements in the singular, for example, using the articles "a," "an" or "the," is not to be construed as limiting the element to the singular and may, in some instances, be construed in the plural.

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the components and structures disclosed herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

The invention claimed is:

1. A computer system for detecting a gas leak, the computer system comprising:
    communications circuitry configured to receive, from a user device, an electronic indication of a monitoring mode for an ultrasonic gas leak detection device;
    monitoring mode determination circuitry in communication with the communications circuitry, wherein the monitoring mode determination circuitry is configured to determine whether the monitoring mode corresponds to a standard mode or a focus mode;
    ultrasonic gas leak monitoring circuitry in communication with the monitoring mode determination circuitry, wherein the ultrasonic gas leak monitoring circuitry is configured to
        in response to a first determination that the monitoring mode corresponds to the standard mode, monitor a first range of ultrasonic frequencies to generate a first set of monitored data, and
        in response to a second determination that the monitoring mode corresponds to the focus mode, monitor a second range of ultrasonic frequencies to generate a second set of monitored data; and
    ultrasonic gas leak detection circuitry in communication with the ultrasonic gas leak monitoring circuitry, wherein the ultrasonic gas leak detection circuitry is configured to
        in response to the first determination that the monitoring mode corresponds to the standard mode, generate a first ultrasonic gas leak detection signal based on the first set of monitored data, and
        in response to the second determination that the monitoring mode corresponds to the focus mode, generate a second ultrasonic gas leak detection signal based on the second set of monitored data.

2. The computer system of claim 1, wherein the computer system further comprises:
    user interface circuitry in communication with the communications circuitry, wherein the user interface circuitry is configured to:
        generate user interface data for display on the user device, wherein the user interface data comprises a list of monitoring modes comprising the standard mode and the focus mode;
    wherein the communications circuitry is configured to:
        transmit the user interface data to the user device; and
        receive the electronic indication of the monitoring mode in response to a user selection of one of the standard mode and the focus mode.

3. The computer system of claim 1, wherein the electronic indication of the monitoring mode corresponds to the standard mode or the focus mode.

4. The computer system of claim 1, wherein the monitoring mode determination circuitry is configured to determine that the monitoring mode corresponds to the standard mode when the electronic indication of the monitoring mode corresponds to the standard mode.

5. The computer system of claim 1, wherein the monitoring mode determination circuitry is configured to determine that the monitoring mode corresponds to the standard mode when the electronic indication of the monitoring mode is indicative of a null or empty value.

6. The computer system of claim 1, wherein the monitoring mode determination circuitry is configured to determine that the monitoring mode corresponds to the focus mode when the electronic indication of the monitoring mode corresponds to the focus mode.

7. The computer system of claim 1, wherein the second range of ultrasonic frequencies is different from the first range of ultrasonic frequencies.

8. The computer system of claim 1, wherein the first range of ultrasonic frequencies is from about 20 kHz to about 30 kHz.

9. The computer system of claim 1, wherein the second range of ultrasonic frequencies is from about 50 kHz to about 70 kHz.

10. The computer system of claim 1, wherein the ultrasonic gas leak monitoring circuitry is configured to monitor the first range of ultrasonic frequencies using a microphone comprising a 20 millimeter diaphragm.

11. The computer system of claim 1, wherein the ultrasonic gas leak monitoring circuitry is configured to monitor the second range of ultrasonic frequencies using a microphone comprising a 20 millimeter diaphragm.

12. The computer system of claim 1, wherein the first ultrasonic gas leak detection signal comprises an alarm system activation signal.

13. The computer system of claim 1, wherein the second ultrasonic gas leak detection signal comprises an alarm system activation signal.

14. A computer method for detecting a gas leak, the method comprising:
    receiving, by communications circuitry from a user device, an electronic indication of a monitoring mode for an ultrasonic gas leak detection device;
    determining, by monitoring mode determination circuitry, whether the monitoring mode corresponds to a standard mode or a focus mode;

in response to determining that the monitoring mode corresponds to the standard mode,
  monitoring, by ultrasonic gas leak monitoring circuitry, a first range of ultrasonic frequencies to generate a first set of monitored data, and
  generating, by ultrasonic gas leak detection circuitry, a first ultrasonic gas leak detection signal based on the first set of monitored data; and
in response to determining that the monitoring mode corresponds to the focus mode,
  monitoring, by the ultrasonic gas leak monitoring circuitry, a second range of ultrasonic frequencies to generate a second set of monitored data, and
  generating, by the ultrasonic gas leak detection circuitry, a second ultrasonic gas leak detection signal based on the second set of monitored data.

15. The computer method of claim 14, further comprising:
generating, by user interface circuitry in communication with the communications circuitry, user interface data for display on the user device, wherein the user interface data comprises a list of monitoring modes comprising the standard mode and the focus mode; and
transmitting, by the communications circuitry, the user interface data to the user device,
wherein the receiving the electronic indication of the monitoring mode comprises receiving, by the communications circuitry from the user device, the electronic indication of the monitoring mode in response to a user using the user device to select one of the standard mode and the focus mode.

16. The computer method of claim 14, wherein the electronic indication of the monitoring mode corresponds to the standard mode or the focus mode.

17. The computer method of claim 14, wherein the second range of ultrasonic frequencies is different from the first range of ultrasonic frequencies.

18. The computer method of claim 17, wherein the first range of ultrasonic frequencies is from about 20 kHz to about 30 kHz, and wherein the second range of ultrasonic frequencies is from about 50 kHz to about 70 kHz.

19. The computer method of claim 14, wherein monitoring the first range of ultrasonic frequencies comprises monitoring, by the ultrasonic gas leak monitoring circuitry, the first range of ultrasonic frequencies using a microphone, and wherein monitoring the second range of ultrasonic frequencies comprises monitoring, by the ultrasonic gas leak monitoring circuitry, a second range of ultrasonic frequencies using the microphone, wherein the microphone comprises a 20 millimeter diaphragm.

20. A computer program product for detecting a gas leak, the computer program product comprising at least one non-transitory computer-readable storage medium storing computer-executable program code instructions that, when executed by a computing system, cause the computing system to:
receive, by communications circuitry from a user device, an electronic indication of a monitoring mode for an ultrasonic gas leak detection device;
determine, by monitoring mode determination circuitry, whether the monitoring mode corresponds to a standard mode or a focus mode;
in response to a first determination that the monitoring mode corresponds to the standard mode,
  monitor, by ultrasonic gas leak monitoring circuitry, a first range of ultrasonic frequencies to generate a first set of monitored data, and
  generate, by ultrasonic gas leak detection circuitry, a first ultrasonic gas leak detection signal based on the first set of monitored data; and
in response to a second determination that the monitoring mode corresponds to the focus mode,
  monitor, by the ultrasonic gas leak monitoring circuitry, a second range of ultrasonic frequencies to generate a second set of monitored data, and
  generate, by the ultrasonic gas leak detection circuitry, a second ultrasonic gas leak detection signal based on the second set of monitored data.

* * * * *